United States Patent [19]
Booher

[11] Patent Number: 4,613,152
[45] Date of Patent: Sep. 23, 1986

[54] COMPOSITE TRANSVERSE BEAM AND SPRING SYSTEM FOR AN AUTOMOBILE

[76] Inventor: Benjamin V. Booher, 1721 Aldersgate, Leucadia, Calif. 92024

[21] Appl. No.: 729,474

[22] Filed: May 1, 1985

[51] Int. Cl.$^4$ ............................................. B16F 1/30
[52] U.S. Cl. .................................. 280/669; 280/694; 280/719; 267/47
[58] Field of Search ............... 280/669, 686, 699, 719, 280/718, 720; 267/19 A, 47

[56] References Cited

U.S. PATENT DOCUMENTS

| | | | |
|---|---|---|---|
| 1,679,853 | 8/1928 | Cottin | 280/669 |
| 1,990,802 | 2/1935 | Thompson | 267/47 |
| 2,126,130 | 8/1938 | Nallinger | 267/19 A |
| 2,157,773 | 5/1939 | Probst | 180/73 |
| 2,177,897 | 10/1939 | Lee | 280/719 |
| 2,559,105 | 7/1951 | Banning, Jr. | 267/47 |
| 2,635,894 | 4/1953 | Jackman | 280/96.2 |
| 2,697,613 | 12/1954 | Giacosa | 280/719 |
| 3,034,802 | 5/1962 | Axtmann | 280/96.2 |
| 3,142,598 | 7/1964 | Rosen | 156/162 |
| 3,149,855 | 9/1964 | Adloff et al. | 280/669 |
| 3,456,939 | 7/1969 | Duchemin | 267/47 |
| 3,698,702 | 10/1972 | Beck | 267/47 |
| 3,970,166 | 7/1976 | Sheppard | 280/669 |
| 4,509,774 | 4/1985 | Booher | 280/694 |

FOREIGN PATENT DOCUMENTS

| | | |
|---|---|---|
| 0082321 | 6/1983 | European Pat. Off. . |
| 2520304 | 7/1983 | France . |
| 2528364 | 12/1983 | France . |
| WO8301758 | 5/1983 | PCT Int'l Appl. . |
| 305921 | 3/1955 | Switzerland . |

OTHER PUBLICATIONS

Abstract of U.S. Pat. No. 4,540,197 of Finn et al.
Abstract of Japanese Appln. No. 52-140771, Patent No. 54-74058.

*Primary Examiner*—Richard A. Bertsch
*Attorney, Agent, or Firm*—Baker, Maxham & Jester

[57] ABSTRACT

An elongate member with a composite construction has a pair of spring portions connected by an intermediate beam portion. The elongate member is connected to a uni-body or other vehicle frame so that it extends horizontally in a transverse direction across the frame. The spring portions may be tapered so that they are flexible and resilient when a predetermined set of wheel loads are applied to the outer ends thereof. The intermediate beam portion is dimensioned and configured to provide a rigid structural element that may be used to provide additional lateral strength for the uni-body frame. A wheel assembly is connected to the outer end of each of the spring portions and a shock absorber connects each wheel assembly to the uni-body frame to damp up and down motion of the corresponding wheel.

19 Claims, 5 Drawing Figures

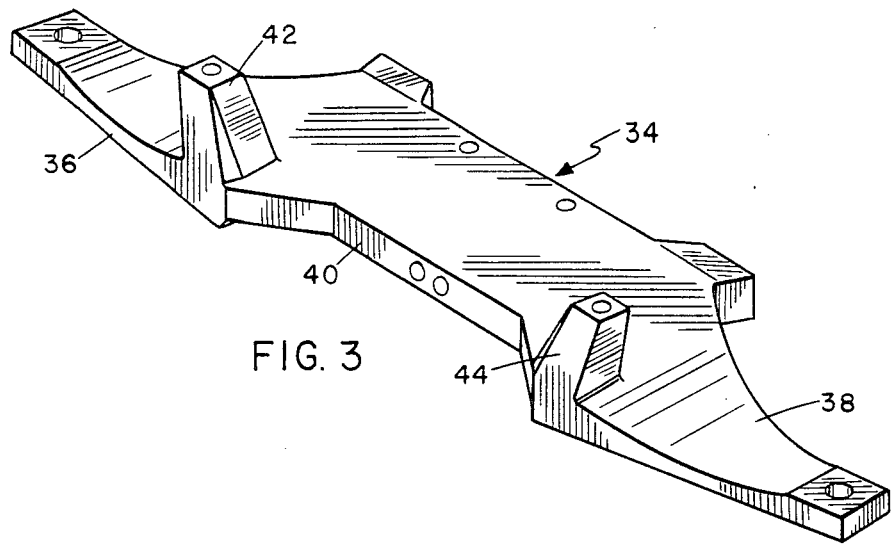
FIG. 3
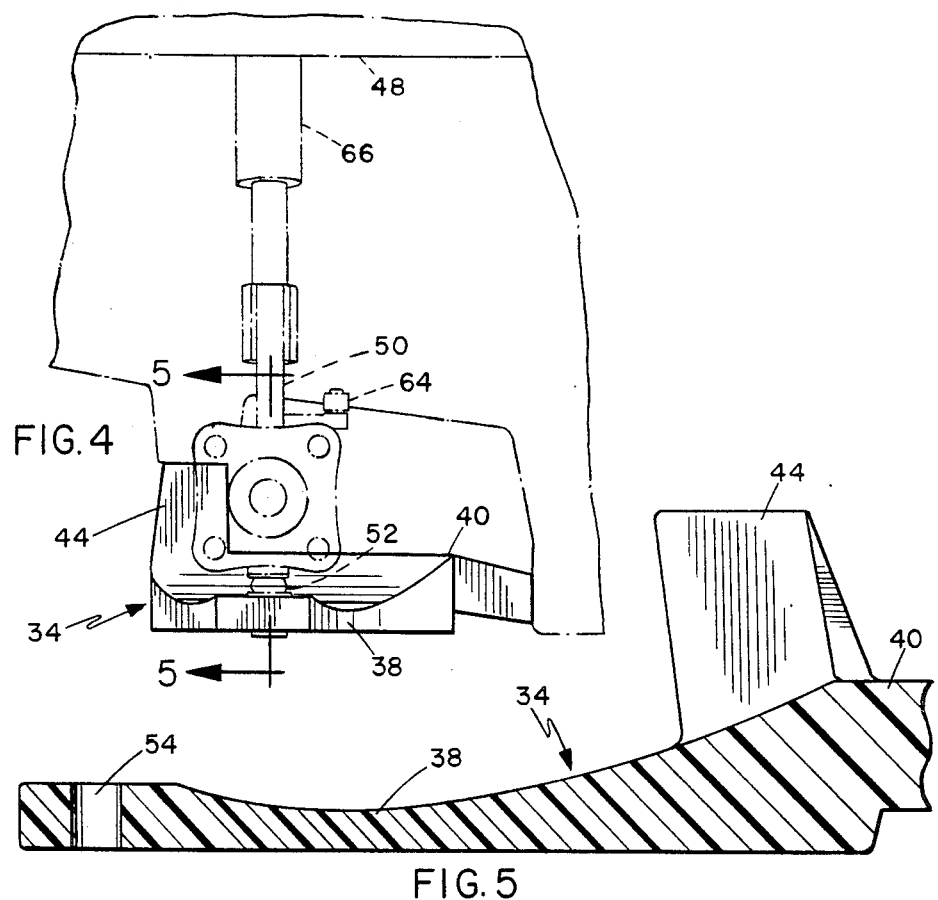
FIG. 4
FIG. 5

COMPOSITE TRANSVERSE BEAM AND SPRING SYSTEM FOR AN AUTOMOBILE

BACKGROUND OF THE INVENTION

The present invention relates to vehicle suspension systems, and more particularly, to an automotive suspension system in which a composite elongate member functions both as a pair of springs and a lateral reinforcing beam to thereby reduce the weight and the number of parts otherwise required in a conventional suspension system.

Vehicle suspension systems have heretofore included shock absorbers, springs (coil, leaf, air or torsion bar), axle housings, torque arms, A-frames, anti-roll bars, stabilizers, and so forth. These components have been assembled in various combinations to produce the desired ride and handling charactersitics of the vehicle. In a typical suspension system, changes in the spacing between axles and the body/chassis are cushioned by springs. Spring vibration is limited by dampers which are usually called shock absorbers. The shock absorbers dissipate the energy stored in the springs by gradually forcing oil through orifices and valves. The flow resistance encountered by the oils results in compression and rebound forces which control the spring movement. The work done by the oils as it moves through the valves converts energy stored in the springs into heat which is dissipated from the shock absorbers into the surrounding air.

There is a continuing effort to reduce the manufacturing cost of automobiles. There is also a continuing effort to increase the milage of automobiles through weight reduction. Both of the aforementioned efforts must not unduly sacrifice performance or reliability. Conventional suspension systems tend to have numerous expensive heavy metal parts. Many of the present day automobiles have a uni-body frame consisting of formed sheet metal which requires that heavy metal transverse support beams be affixed thereto to provide adequate lateral frame strength. It would be desirable to reduce the cost, weight and complexity of existing suspension systems and uni-body reinforcing structures.

U.S. Pat. Nos. 1,679,853 of Cottin; 2,126,130 of Nallinger; 2,157,773 of Probst; 2,177,897 of Lee; and 2,697,613 of Giacosa disclose various automobile suspension systems utilizing transverse leaf springs. Canadian Pat. No. 954,149 discloses a fiber reinforced composite leaf spring. French Pat. No. 2,516,455 discloses an automobile suspension system utilizing a transverse composite leaf spring.

SUMMARY OF THE INVENTION

It is the primary object of the present invention to provide an improved vehicle suspension system.

It is another object of the present invention to provide a vehicle suspension system which is lighter, less costly, and easier to assemble than previous suspension systems but which is durable and provides a smooth ride with good handling.

It is another object of the present invention to provide a combined reinforcing beam and dual spring for use in a suspension system for a vehicle having a uni-body frame to thereby save space, weight and cost without sacrificing performance or reliability.

In accordance with the illustrated embodiment of my invention an elongate member with a composite construction has a pair of spring portions connected by an intermediate beam portion. The elongate member is connected to a uni-body or other vehicle frame so that it extends horizontally in a transverse direction across the frame. The spring portions may be tapered so that they are flexible, and resilient when a predetermined set of wheel loads are applied to the outer ends thereof. The intermediate beam portion is dimensioned and configured to provide a rigid structural element that may be used to provide additional lateral strength for the uni-body frame. A wheel assembly is connected to the outer end of each of the spring portions and a shock absorber connects each wheel assembly to the uni-body frame to damp up and down motion of the corresponding wheel.

BRIEF DESCRIPTION OF THE DRAWINGS

FIG. 3 is a reduced perspective view of the composite elongate member of the preferred embodiment which functions both as a dual spring and a reinforcing beam.

FIG. 4 is a fragmentary side elevation view of the preferred embodiment with portions illustrated in phantom lines and taken along line 4—4 of FIG. 2.

FIG. 5 is an enlarged vertical section view of the composite elongate member of the preferred embodiment taken along line 5—5 of FIG. 4.

DESCRIPTION OF THE PREFERRED EMBODIMENT

The entire disclosure of my U.S. Pat. No. 4,509,774 entitled "COMPOSITE CONTROL ARM APPARATUS" granted Apr. 9, 1985 is specifically incorporated herein by reference.

Figure 1:
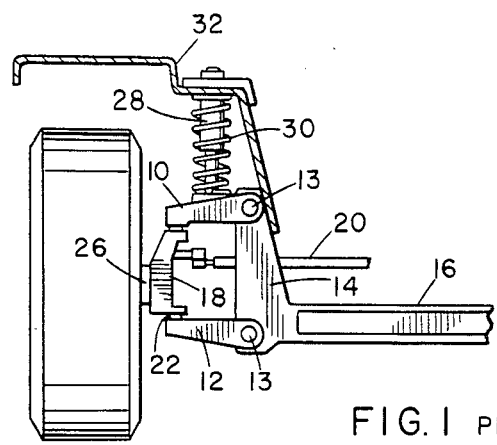
FIG. 1 is a rear elevation view of a typical prior art suspension system for the front wheel of an automobile.

FIG. 1 illustrates a typical prior art front suspension system in which heavy upper and lower metal control arms 10 and 12 are pivotally coupled at their inner ends via pins 13 to a metal frame 14 including a heavy crossbeam or axle 16. A steering knuckle 18 is turned via steering linkage 20 and is connected between the outer ends of the control arms 10 and 12 by ball joints 22. A tire 24 carried by a rim (not visible) is rotatably mounted on a wheel hub assembly 26 bolted to the steering knuckle 18. A shock absorber 28 and surrounding coil spring 30 are connected between the upper control arm 10 and the fender well portion 32 of the frame.

Referring to FIG. 3, the preferred embodiment of my suspension system utilizes an elongate member 34 having tapered end portions 36 and 38 which function as springs and an intermediate portion 40 which functions as a rigid structural element. The member 34 preferably has a composite construction such as fibers held together with a suitable binder. For example, fiberglass impregnated resin cured in a mold under pressure may produce a satisfactory unit. Other high strength, lightweight composite materials may be utilized such as those employing graphite and KEVLAR (trademark) fibers held together with suitable resin, epoxy or other binder. The member 34 may have any of the composite constructions disclosed in my aforementioned U.S. Pat. No. 4,509,774 including a metal core with an elastomeric component bonded thereto, and laminations of binder impregnated fibers, the fibers in different laminations extending in different directions. The member may be made of a first component which provides dimensional integrity and a second component which provides flexibility.

The spring portions 36 and 38 of the elongate member 34 (FIG. 3) are dimensioned and configured so that they will flex up and down when a predetermined set of wheel loads are applied to the outer ends thereof. As illustrated in FIGS. 3 and 5, the spring portions have a width and thickness which varies moving longitudinally along the member. The intermediate beam portion 40 of the member is dimensioned and configured to provide a substantially rigid structural element when the predetermined set of wheel loads are applied to the spring portions as encountered during driving. Thus the intermediate beam portion 40 may be substantially thicker than the spring portions, and may have a uniform cross-section or a cross-section that resists bending such as an I-beam configuration. The elongate member has formed therein upstanding posts 42 and 44 for mounting the member to the vehicle frame.

Figure 2:
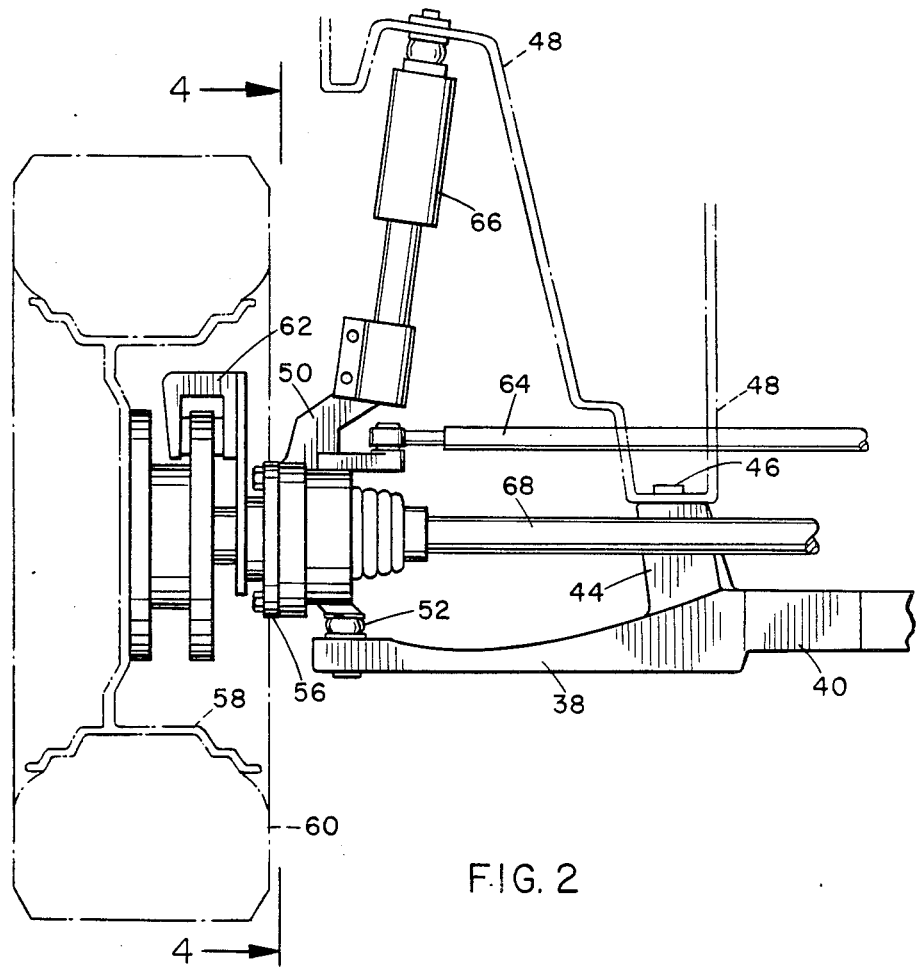
FIG. 2 is a rear elevation view of a preferred embodiment of my suspension system illustrating the portions associated with one of the two wheels thereof.

Referring to FIG. 2, the post 44 of the elongate composite member 34 is connected via bolt 46 to a portion 48 on one side of the uni-body frame 48 illustrated in phantom lines. The other post 42 of the member is similarly connected to the other side of the frame. It will be understood that the preferred embodiment of my suspension system has two identical arrangements on either side of the vehicle like that illustrated in FIG. 2. Thus the elongate member 34 extends horizontally in a transverse direction across the vehicle frame 48 and the spring portions, being horizontal and planar in configuration are capable of flexing upwardly and downwardly relative to the frame and the intermediate beam portion under the forces exerted against the outer ends of the spring portions by the wheels.

Referring to FIGS. 2 and 4, a steering knuckle 50 is connected to the outer end of the spring portion 38 via ball joint 52 mounted in a hole 54 (FIG. 5) in the spring portion. A wheel hub assembly 56 (FIGS. 2 and 4) is bolted to the steering knuckle 50 and supports a wheel rim 58, tire 60 and disk brake assembly 62. A steering linkage 64 is connected to the steering knuckle 50. A shock absorber 66 is connected between the upper end of the steering knuckle and the wheel well portion of the uni-body frame 48 for damping up and down motion of the wheel assembly mounted to the outer end of the spring portion 38. A drive shaft 68 extends through the wheel hub assembly.

The intermediate beam portion 40 of the composite member may serve as the principal lateral reinforcing structure for the uni-body frame, or it may function similar to an axle in a ladder type automobile frame.

My invention eliminates much of the heavy, expensive hardware found in conventional suspensions such as the metal control arms, coil or leaf springs, and certain bushings and other mounting hardware. A smooth ride with good road handling may easily be achieved by optimizing the shape and materials of the elongate member and the particularly geometries involved in the vehicle.

Having described a preferred embodiment of the suspension system it will be apparent to those skilled in the art that my invention is subject to a wide variety of modifications and adaptations. Therefore the protection afforded my invention should only be limited in accordance with the scope of the following claims.

I claim:

1. A vehicle suspension system, comprising:
a frame;
an elongate member having a pair of flexible, resilient spring portions connected by a substantially rigid intermediate beam portion;
means for connecting the intermediate beam portion to the frame so that the member extends horizontally in a transverse direction across the frame and the spring portions can flex upwardly and downwardly relative to the frame;
a pair of wheel supporting means each connected to an outer end of a corresponding spring portion; and
a pair of shock absorber means each connecting the outer end of a corresponding spring portion and the frame for damping up and down motion of the corresponding wheel supporting means.

2. A vehicle suspension system according to claim 1 wherein the elongate member has a composite construction.

3. A vehicle suspension system according to claim 2 wherein the composite construction includes fibers held together with a binder.

4. A vehicle suspension system according to claim 2 wherein the composite construction includes a component which provides dimensional integrity and a component which provides flexibility.

5. A vehicle suspension system according to claim 1 wherein the spring portions have a thickness dimension which varies in a longitudinal direction along the elongate member to thereby determine their flexibility.

6. A vehicle suspension system according to claim 1 wherein the spring portions have a width dimension which varies in a longitudinal direction along the elongate member to thereby determine their flexibility.

7. A vehicle suspension system according to claim 1 wherein the spring portions have a width dimension and a thickness dimension which varies in a longitudinal direction along the elongate member to thereby determine their flexibility.

8. A vehicle suspension system according to claim 2 wherein the composite construction includes a metal portion joined to an elastomeric portion.

9. A vehicle suspension system according to claim 1 wherein the cross-sectional area of the spring portions gradually increases in a longitudinal direction along the elongate member moving toward the beam portion from the outer end of each of the spring portions.

10. A vehicle suspension system according to claim 1 wherein the beam portion is dimensioned to provide its substantial rigidity.

11. A vehicle suspension system according to claim 1 wherein the beam portion is configured to provide its substantial rigidity.

12. A vehicle suspension system according to claim 1 wherein the elongate member is Preformed so that the spring portions curve relative to the beam portion but extend substantially horizontally when subjected to loads imparted by the wheel means.

13. A vehicle suspension system according to claim 2 wherein the composite construction includes a core made of a material having a density for providing dimensional integrity and a lamination made of a material having a density for providing flexibility.

14. A vehicle suspension system comprising:
a uni-body frame;
an elongate member having a composite construction including fibers held together with a binder, the member having opposite spring portions connected by an intermediate beam portion, each spring portion being dimensioned and configured to be flexible and resilient when a predetermined set of wheel loads are applied to an outer end thereof, and the intermediate beam portion being dimensioned and configured to provide a substantially rigid structural element when the predetermined set of wheel loads are applied to the spring portions; and means for connecting the intermediate beam portion to the uni-body frame so that the elongate member extends horizontally in a transverse direction across the frame and the opposite spring portions can flex upwardly and downwardly relative to the frame when the predetermined set of wheel loads are applied to the outer ends of the spring portions.

15. A component for a vehicle suspension system, comprising:

an elongate member having first and second spring portions connected by an intermediate beam portion, each spring portion being dimensioned and configured to be flexible and resilient when a predetermined set of wheel loads are applied to an outer end thereof, and the intermediate beam portion being dimensioned and configured to provide a substantially rigid structural element when the predetermined set of wheel loads are applied to the spring portions.

16. A component according to claim 15 wherein the elongate member has a composite construction.

17. A component according to claim 16 wherein the composite construction includes fibers held together with a binder.

18. A component according to claim 16 wherein the composite construction includes a metal core and an elastomeric portion joined to the core.

19. A component according to claim 15 wherein the spring portions taper inwardly moving in a longitudinal direction from the intermediate beam portion to the outer ends thereof.

* * * * *